United States Patent [19]

Lowsky et al.

[11] Patent Number: 4,992,166

[45] Date of Patent: Feb. 12, 1991

[54] PLASTIC FLUID FILTER AND METHOD FOR MANUFACTURING SAME

[75] Inventors: John Lowsky; Scott Trierwiler, both of Fayetteville; Steven Cline, Hope Mills, all of N.C.

[73] Assignee: Facet Enterprises, Inc., Tulsa, Okla.

[21] Appl. No.: 205,632

[22] Filed: Jun. 13, 1988

[51] Int. Cl.⁵ .......................................... B01D 27/10
[52] U.S. Cl. .................................. 210/130; 210/136; 210/232; 210/440; 210/443; 210/450; 210/DIG. 17; 264/299; 264/DIG. 48
[58] Field of Search .............. 210/130, 136, 435, 436, 210/440, 443, 444, 450, 453, DIG. 17, 232; 264/DIG. 48, 299, 298; 55/DIG. 5; 123/196 A

[56] References Cited

U.S. PATENT DOCUMENTS

| | | | |
|---|---|---|---|
| 1,825,983 | 10/1931 | Sweetland | 210/304 |
| 2,185,281 | 1/1940 | Tear | 210/178 |
| 2,995,250 | 8/1961 | Boewe et al. | 210/130 |
| 3,000,506 | 9/1961 | Hultgren | 210/133 |
| 3,076,551 | 2/1963 | Humbert, Jr. | 210/232 |
| 3,085,688 | 4/1963 | Eberle | 210/232 |
| 3,225,929 | 12/1965 | Sicard | 210/232 |
| 3,256,989 | 6/1966 | Hultgren | 210/130 |
| 3,265,213 | 8/1966 | Decker et al. | 210/136 |
| 3,333,703 | 8/1967 | Scavuzzo et al. | 210/232 |
| 3,397,786 | 8/1968 | Hultgren | 210/132 |
| 3,411,632 | 11/1968 | Offer et al. | 210/440 |
| 3,490,594 | 1/1970 | Hutchins, Jr. | 210/232 |
| 3,616,933 | 11/1971 | Baldwin | 210/440 |
| 3,722,691 | 3/1973 | Francois | 210/304 |
| 4,052,307 | 10/1977 | Humbert, Jr. | 210/130 |
| 4,324,660 | 4/1982 | Peyton et al. | 210/440 |
| 4,349,438 | 9/1982 | Sims | 210/180 |
| 4,364,829 | 12/1982 | Atkins et al. | 210/238 |
| 4,369,113 | 1/1983 | Stifelman | 210/440 |
| 4,465,595 | 8/1984 | Cooper | 210/238 |
| 4,473,471 | 9/1984 | Robichaud et al. | 210/443 |
| 4,497,706 | 2/1985 | Pickett et al. | 210/130 |
| 4,541,265 | 9/1985 | Dye et al. | 72/349 |
| 4,654,142 | 3/1987 | Thomsen et al. | 210/232 |
| 4,764,275 | 8/1988 | Robichaud | 210/232 |

FOREIGN PATENT DOCUMENTS

| | | |
|---|---|---|
| 229092 | 8/1963 | Austria . |
| 639408 | 4/1962 | Canada ............... 182/64 |
| 0221675 | 5/1987 | European Pat. Off. . |
| 2326212 | 12/1974 | Fed. Rep. of Germany . |
| 2082912 | 12/1971 | France . |
| 2478249 | 9/1989 | France . |
| 982548 | 2/1965 | United Kingdom . |
| 982466 | 4/1965 | United Kingdom . |
| 1355832 | 6/1974 | United Kingdom . |

OTHER PUBLICATIONS

EPO Search Report Dated Oct. 5, 1989.

Primary Examiner—Richard V. Fisher
Assistant Examiner—Wanda L. Millard
Attorney, Agent, or Firm—Staas & Halsey

[57] ABSTRACT

A fluid filter and methods for manufacturing same are described. The fluid filter includes: a filter element; a plastic housing for the filter element; and a plastic closure member including fluid inlet holes, each having an axis which is angled outwardly relative to the longitudinal axis of the filter housing. The closure member and the housing can be connected by welding, or the housing and the closure member may include complementary interengageable locking means for engagement. One method of manufacture includes the steps of forming a plastic housing and closure member and spin welding them together. Another method includes the steps of: forming the housing and closure member with complementary interengageable locking members; aligning the locking members; and turning the housing to engage the housing and the closure member. With either method, the assembled filter is then spun onto a threaded stud on a filter mount.

24 Claims, 5 Drawing Sheets

PLASTIC FLUID FILTER AND METHOD FOR MANUFACTURING SAME

BACKGROUND OF THE INVENTION

This invention relates to fluid filters, such as disposable-type oil filters, and methods for manufacturing same.

The type of oil filter currently used for automobile and aircraft engines is the "spin-on," metal, disposable type. This filter is relatively inexpensive to mass produce and relatively easy to install and replace.

A conventional spin-on, disposable-type, fluid filter is shown in FIG. 1 herein and is indicated generally by reference numeral 10. This filter 10 includes: a metal housing 12 having a cylindrical side wall 14; a shaped, closed end 26 having means 70 such as a hex nut for cooperation with a filter wrench (not shown); and an opposite, open end 28. The housing 12 can be made according to the drawing and ironing process described in co-assigned U.S. Pat. No. 4,541,265, issued to Dye et al.

The housing 12 shown in FIG. 1 is particularly suitable for aviation purposes. That is, aviation filters are required by federal regulations to accept an additional wire connection (not shown) between tabs 71 formed on the closed end 26 of the housing 12 and a filter mount 46 to ensure that the filter, even if same loosens during operation, will not come off the filter mount 46.

The filter 10 also includes: a filter element 16 positioned around a perforated center tube 18, bordered by end caps 20, 22, and positioned within the housing 12 by an element guide 24; a thick, metal end plate 30; and a retainer 32. Each of the end plate 30 and retainer 32 includes inlet openings 34 and 36, respectively, to allow oil to flow into the filter 10. The housing 12 and end plate 30/retainer 32 combination are connected at the open end 28 by a known welding process (aviation applications) or clinching process (automotive applications) to create a leakproof seam therebetween.

An annular, resilient sealing gasket 40 is retained in an annular channel 42 formed on the retainer 32. The gasket 40 cooperates with a flat sealing surface 44 on the filter mount 46. The filter mount 46 is formed on an engine 48 and includes oil flow openings 50. Located centrally of the end plate 30 is a threaded aperture 52 which receives a threaded stud 54 carried by the filter mount 46. The threaded stud includes a hollow interior 55.

The filter 10 also includes an antidrain back (ADB) valve 56, an ADB spring 58, a relief valve spring retainer 59, and a pressure relief valve assembly 60. The assembly 60 includes a compression spring 62, a piston support 64 and a piston 66. An example of a conventional pressure relief valve assembly is described in Assignee's U.S. Pat. No. 4,497,706.

In order to install this filter 10 on the engine 48, the filter 10 is spun clockwise onto the stud 54 via the threaded aperture 52. To remove same, a filter wrench is engaged with the means 70 and turned counterclockwise.

During normal operation, flow of oil is from the engine 48, through the oil flow openings 50 formed in filter mount 46, into the inlet openings 36, 34 formed in the retainer 32 and end plate 30, respectively, against and around the ADB valve 56 with some turbulence as noted by arrows A, through the filter media 16, through the center tube 18, through the central aperture 52, into the hollow interior 55 of the stud 54 and back to the engine 48. In the "bypass" mode, when oil pressure at the pressure relief valve assembly 60 exceeds a predetermined level, oil flows through the assembly 60 and directly into the center tube 18, thereby bypassing the filter element 16 and returning to the engine 48.

The common and continuing problems of this conventional metal, spin-on, disposable filter are discussed below.

First, due to the great pressures encountered during operation, it has been thought necessary to manufacture the area of attachment of the filter 10 to the filter mount 46, particularly the end plate 30, from a metal whose thickness and strength can withstand these pressures. Of course, a filter design requiring thick, strong metal for the area of attachment results in high raw material and manufacturing costs.

Second, the total raw material cost of the filtration process components, i.e. filter element 16, related adhesives, etc., is less than a third of the total raw material cost of each filter 10. The remaining two-thirds of the cost is related to the non-filtration process components, i.e. the sealing gasket 40, end plate 30, etc. Due to this disproportional cost ratio, it is highly desired to minimize the cost of the non-filtration process components.

Third, the conventional fluid filter 10 requires machining or cutting of various parts, such as the threaded stud 54 and central aperture 52. The goal of generating high volume production of fluid filters including quality threads, without leaving traces of chips and burrs, has posed serious, longstanding problems in the industry.

Fourth, the inlet openings 34 have axes which are substantially parallel to the longitudinal axis of the filter 10. Such openings 34, in combination with the ADB valve 56 and ADB spring 58, cause the oil flow in such a manner as to create high non-laminar flows and high initial pressure restrictions.

Fifth, the end plate 30/retainer 32 combination must be assembled through an intricate clinching or welding process, adding cost to the production.

Accordingly, the fluid filter described above necessarily demands that relatively thick metal be used in the area of attachment, is relatively expensive and difficult to manufacture, and frustrates laminar fluid flow.

Assignee's U.S. Pat. No. 4,764,275, issued Aug. 16, 1988 and entitled "Fluid Filter And Method For Attaching Same In Sealing Relation To A Filter Mount," which is incorporated by reference herein, proposes a more easily installed and removed fluid filter, wherein the filter and filter mount incorporate interlocking means. The interlocking means includes, e.g. pairs of corresponding flanges formed on the filter and filter mount, respectively. However, the fluid filter described therein still does not fully overcome the drawbacks of known fluid filters.

First, if an adaptor is used to retrofit a conventional filter mount to receive the filter described in the co-pending application, the adapter must still be machined resulting in a costlier part.

Second, the filter housing must have formed therein, in the area of the interlocking means, an area for properly containing a sealing ring to seal against the filter mount. Forming this sealing ring retainer is difficult and labor intensive.

Third, the seal is not an "off the shelf" common seal, but rather a more expensive "quad" seal.

Fourth, interlocking means in the form of flanges must be roll formed or machined and must be positioned and then welded to the metal housing, all of which are labor intensive steps.

Fifth, there are still a relatively large number of components in this filter, thus increasing manufacturing steps and costs.

Sixth, the pressure relief valve assembly and ADB valve components are machined out of metal and are intricate to assemble.

Thus, it can be seen that the Assignee's earlier invention, if manufactured in metal, presents problems in both the component manufacture and assembly operations.

Neither of the above-described fluid filters have the novel features of the invention disclosed herein which overcome these disadvantages.

SUMMARY OF THE INVENTION

It is an object of the present invention to provide a fluid filter with less components, by eliminating the end plate/retainer combination and element guide, thereby providing a potentially smaller and lighter filter and allowing greater freedom in manufacturing design.

It is another object of the present invention to provide a fluid filter, whose non-filtration components can be manufactured less expensively out of plastic than their metal conventional counterparts.

It is another object of the present invention to provide a fluid filter whose components do not require any machining or cutting, but instead are injection molded out of a plastic resin.

It is another object of the present invention to provide a plastic fluid filter housing which can be attached to a closure member, and the assembled filter attached to a filter mount, quickly and easily.

It is another object of the present invention to provide a fluid filter and methods for manufacturing same which are relatively simple and have a minimal number of components and steps, respectively, thereby ensuring low-cost, automated, mass-production.

It is another object of the present invention to provide a fluid filter having inlet holes which facilitate laminar flow and increase cooling.

Finally, it is an object of the present invention to provide a less expensively manufactured fluid filter utilizing a relatively low cost, "spin-welding" process in lieu of the conventional, relatively expensive welding process.

To achieve the foregoing objects, and in accordance with the purposes of this invention, as embodied and broadly described herein, there are provided the following fluid filter and methods for manufacturing same.

The fluid filter includes: a plastic housing having an open end and a closed end; a filter element in the housing; and a plastic closure member having an aperture formed therein and being connected to the open end of the housing. In one embodiment, complementary, radial, interengagable locking means are formed on the housing and the closure member for engaging the housing with the closure member. The locking means are also formed of plastic. The closure member also includes flow holes whose axes are angled outwardly relative to the longitudinal axis of the housing.

One method includes the steps of injection molding a plastic housing and plastic closure member and spin-welding these two components together. A second method includes forming the locking means described above on both the housing and closure member and connecting the housing and closure member by interlocking engagement. With either method, the assembled filter can then be spun onto a filter mount.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The preferred embodiments of the present invention will now be described with reference to FIGS. 2-13.

Figure 10:
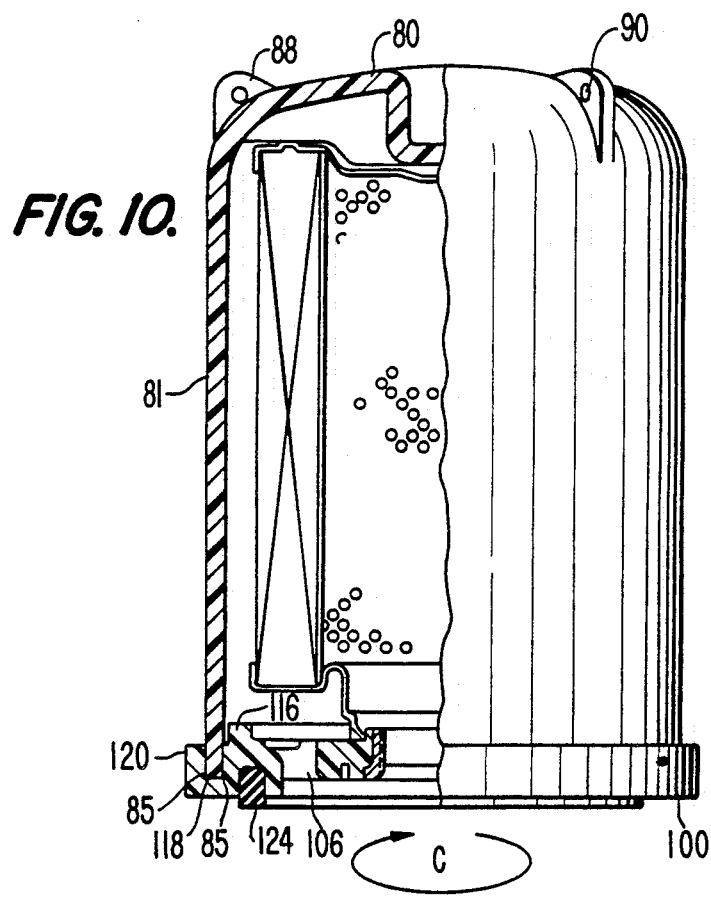
FIG. 10 is an elevational, partial cross-sectional view of the plastic fluid filter according to the present invention.
Figure 12:
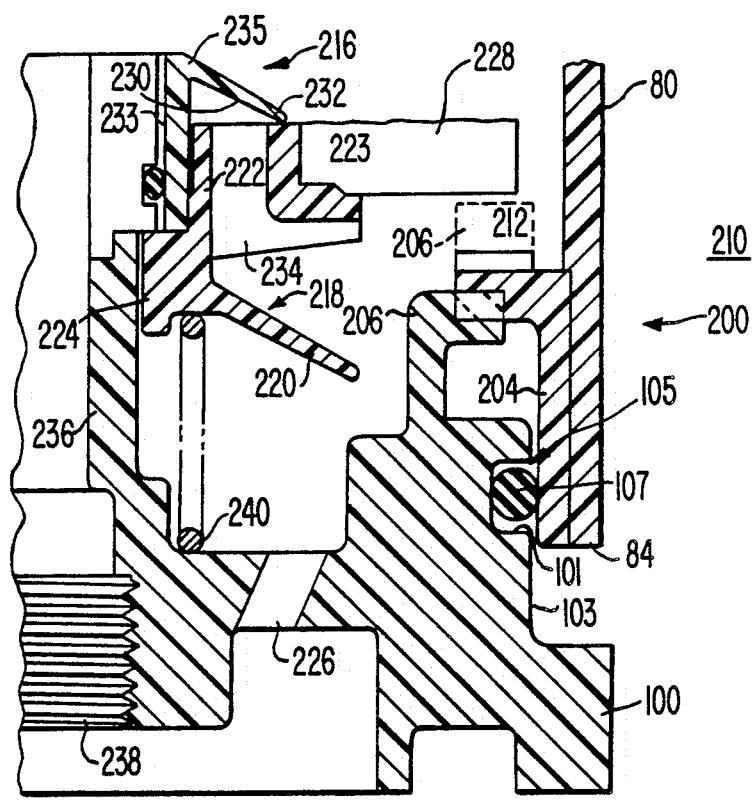
FIG. 12 is a side, cross-sectional view of an alternate embodiment of the fluid filter according to the present invention.
Figure 13:
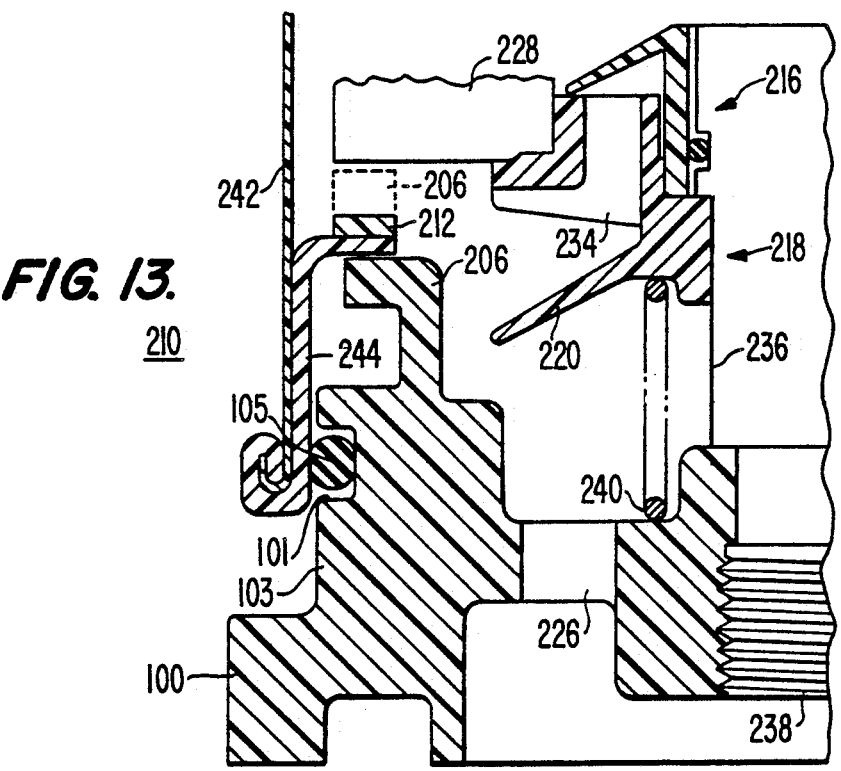
FIG. 13 is a side, cross-sectional view of still another embodiment of the fluid filter according to the present invention.

As best seen in FIGS. 10, 12, and 13, the filter according to the present invention includes generally a housing, a mounting plate or closure member, a pressure relief valve, an ADB valve, and a filter element, each of which are discussed in detail below.

Figure 2:
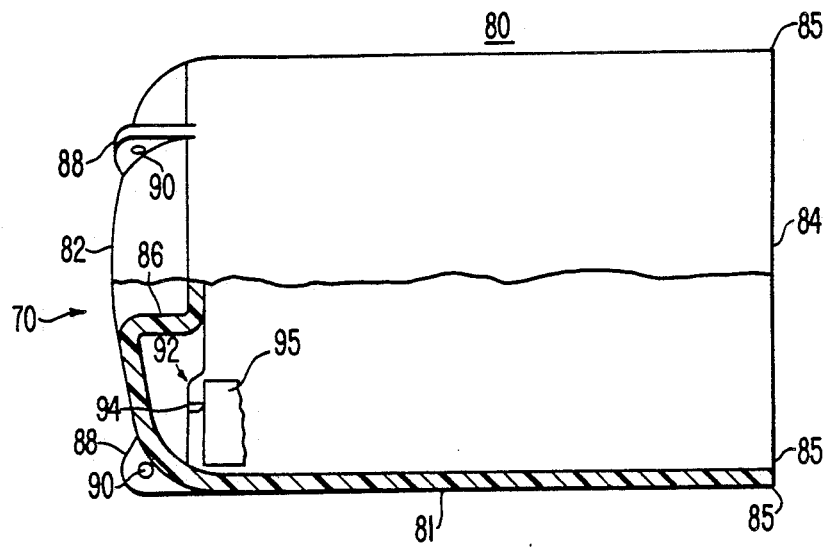
FIG. 2 is a side, partial cross-sectional view of a plastic filter housing according to the present invention.

FIG. 2 illustrates an embodiment of the housing 80 according to the present invention. As with the conventional housing 12 described above, the housing 80 includes a cylindrical side wall 81, a closed end 82 and an open end 84. However, unlike the conventional housing 12, the housing 80 is a one-piece member made of plastic, preferably by injection molding.

The plastic is preferably a nylon-based resin such as HILOY$_{TM}$ 610, a polyamide polymer sold by Comalloy International Corp. of Brentwood, Tenn. 37017 or ZYTEL$_{TM}$ 77G43L (nylon 66), sold by the DuPont Company of Wilmington, Del. 19898. Other plastics can be used as long as they are able to withstand the repeated temperature and pressure cycles of a fluid filter. The plastic can be clear or colored. Clear plastic has the benefits of allowing one to see internal parts during quality inspection and to see how "dirty" the filter is during use.

The closed end 82 can be molded to include one of several known filter wrench attachment means 70, such as an indented square-shaped recess 86 for receiving a similarly shaped wrench. By molding a recess 86, the overall length of the can is reduced, a benefit in today's overall automotive downsizing efforts.

Figure 1:
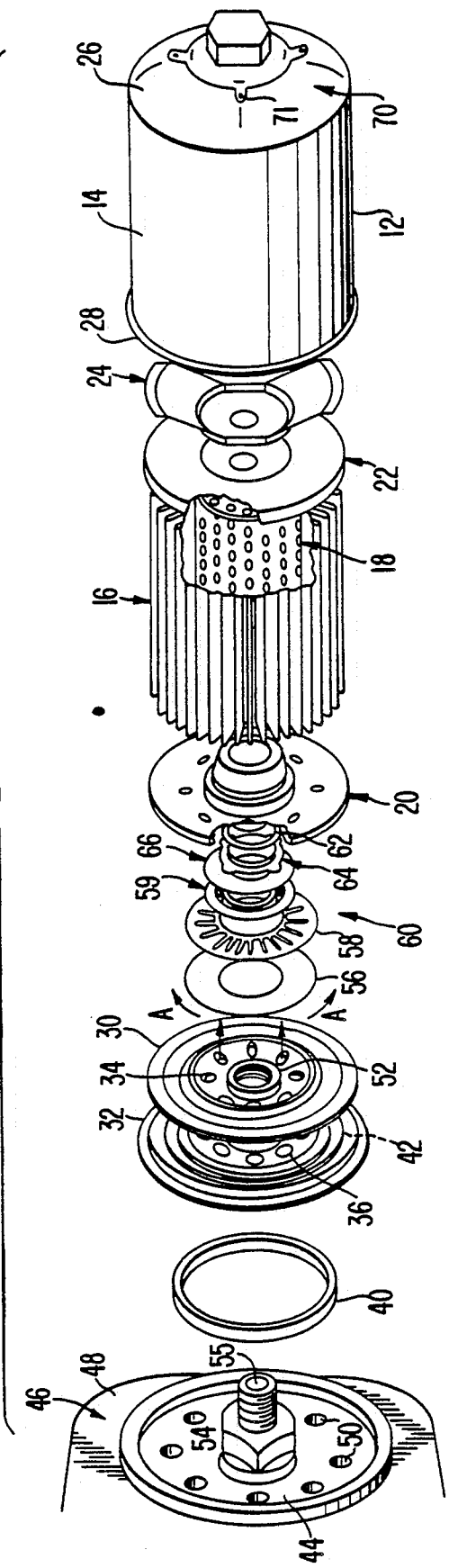
FIG. 1 is an exploded, perspective view of a conventional, spin-on, disposable type, aviation, metal, fluid filter.

Alternatively, an external hex nut like that shown in FIG. 1 can be integrally formed on the housing 80 as the attachment means 70. If the external hex nut attachment is molded, a slightly greater volume is obtained relative to the filter shown in FIG. 1, but for the same outer dimensions.

The ability to mold the attachment means 70 integrally further reduces costs. That is, the conventional attachment step of laser welding the means 70 on the metal housing 12 is eliminated.

Still further, a repeatedly indented edge can also be used as known in the art which facilitates hand installation and removal of the filter (see, e.g. U.S. Pat. No. 3,265,213, issued to Decker et al.). Finally, a conventional strap wrench could be used to remove the filter.

External tabs 88 with holes 90 can also be formed at the closed end 82, for receiving the additional wire connection required for aviation filters described above. Such tabs 88 are not needed for automotive filters.

Although an aviation-type filter is shown in FIG. 2, it is to be understood that the present invention is equally applicable to automotive and other fluid filter applications. The basic differences between aviation and automotive filters relate to burst considerations. For example, automotive filters operate at about 300 psi, whereas aviation filters operate at about 500 psi, thus requiring a thicker housing side wall. However, the respective interior structures, such as the filter element, are generally the same.

The open end 84 of the housing 80 has slightly tapered edges 85 which facilitate the spin-welding connection of the housing 80 and closure member 100 described below.

The housing 80 can also be molded to include means 92 for positioning and preloading a filter element 95 relative to the closed end 82 of the housing. This means 92 may take the form of one or more projections 94 integrally molded along the inside of the closed end 82. In this manner, the conventional element guide 24 discussed above, can be eliminated, thereby lowering production costs and speeding assembly. Alternatively, if desired, a conventional element guide could instead be used.

FIGS. 3–7 illustrate the closure member 100 for the open end of the housing 80. This closure member 100, like the housing 80 is a one-piece injection molded plastic member. The plastic can again be HILOY$_{TM}$ or ZYTEL$_{TM}$ as noted above, or any other suitable plastic.

The closure member 100 includes a central aperture 102 which can be threaded as shown at 109 in FIG. 4, or can be made to receive a metal insert 130 as described in greater detail below.

Figure 3:
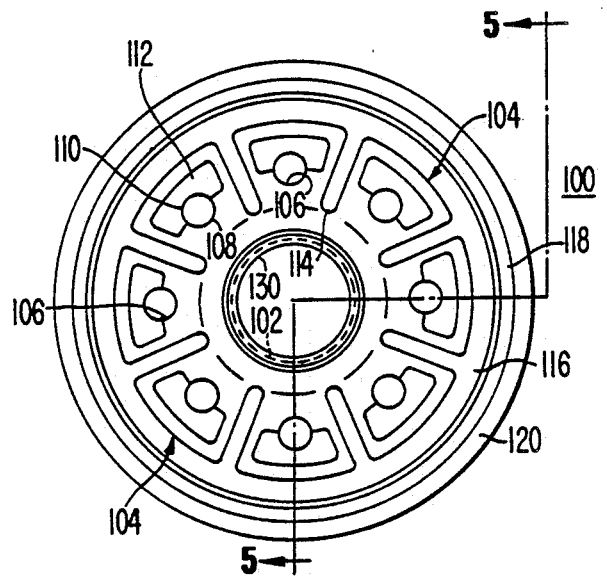
FIG. 3 is a top view of a plastic closure member for the filter according to the present invention.
Figure 5:
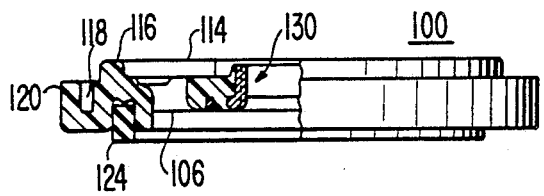
FIG. 5 is a side, partial cross-sectional view of the closure member.
Figure 6:
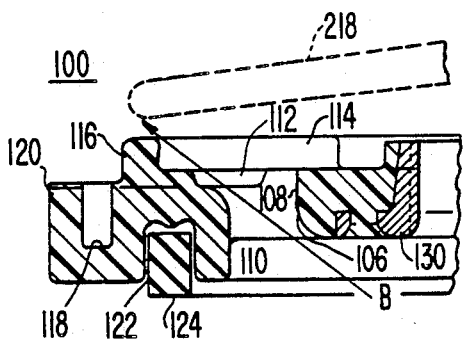
FIG. 6 is an enlarged view of the cross-sectional area shown in FIG. 5.

As best seen in FIGS. 3, 5 and 6, the top of the closure member 100 includes a plurality of fluid inlet openings 104, part of which extend therethrough. In contrast to the conventional inlet openings 34, 36 discussed above, wherein the axis of each is parallel to the longitudinal axis of the housing 12, the inlet openings 104 are intentionally molded at an angle to advantageously direct oil flow. That is, the inlet openings 104 have axes "B" (FIG. 6) which are angled outwardly relative to the direction of flow of the oil and the longitudinal axis of the housing 80 to effectuate, with the ADB valve 218, a decrease in restriction of flow and a better laminar flow as described below in relation to FIG. 12. As a result, less turbulence is created and cooling of the oil is improved.

As seen in FIGS, 3 and 6, each inlet opening includes a substantially circular portion 106 which extends through the closure member 100 and is bordered inwardly by an upstanding, semi-circular wall 108 and outwardly by a sloped, semi-circular wall 110. The sloped wall 110 leads into a fanned depressed area 112.

Each inlet opening 104 is separated from adjacent openings 104 by radial ribs 114 which terminate in a first annular, raised ring 116. The first annular raised ring 116 is bordered outwardly by an annular groove 118, which is bordered outwardly by a second raised annular ring 120.

Figure 4:
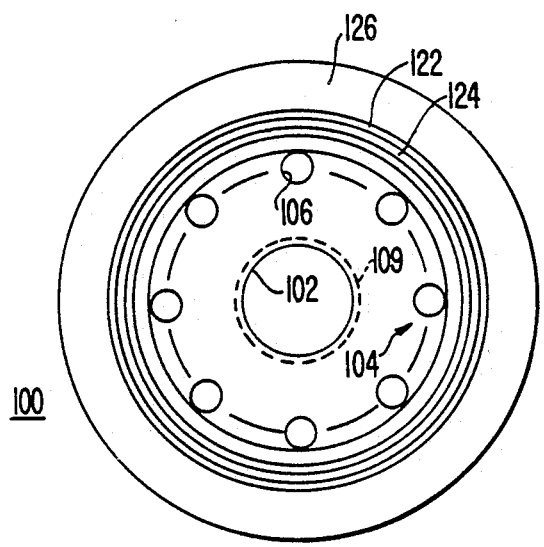
FIG. 4 is a bottom view of a plastic closure member for the filter according to the present invention.
Figure 7:
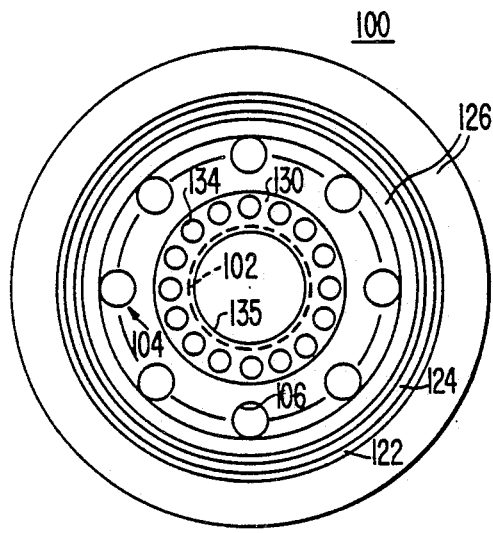
FIG. 7 is a bottom view of a plastic closure member shown in FIG. 3.

As seen particularly in FIGS. 4 and 7, the bottom of the closure member 100 includes a channel 122, formed in a substantially planar surface 126, which receives a separate, otherwise conventional sealing gasket 124. The sealing gasket 124 effects a seal between the closure member 100 and the filter mount 46 when the filter is spun onto the filter mount 46.

Figure 8:
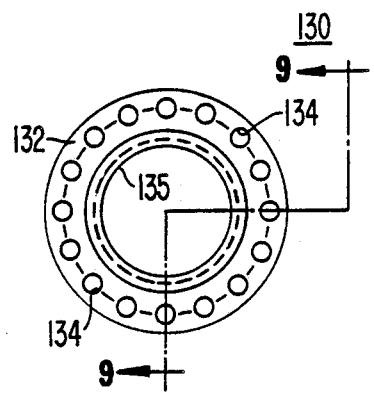
FIG. 8 is a bottom view of the metal insert shown in FIG. 7.
Figure 9:
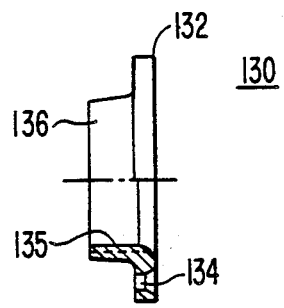
FIG. 9 is a side, partial cross-sectional view of the metal insert shown in FIG. 8.

Instead of threading the plastic central aperture 102 at 109 as shown in FIG. 4, it is preferred that an insert 130, such as shown best in FIGS. 8-9, be used. Such an insert 130 is formed of metal, threaded and incorporated in the closure member 100 when the latter is molded. Use of the insert 130 is particularly preferred for aviation applications due to the greater burst requirements for an aviation filter discussed above.

The insert 130 includes a flanged portion 132 including a plurality of holes 134 formed around a central aperture 135. The holes 134 serve to receive some of the plastic during molding of the closure member 100 to thereafter hold the insert 130 fixed relative to the closure member 100. The insert 130 also includes a cylindrical base 136 extending integrally from the flanged portion 132. The base 136 abuts the aperture 102 in the closure member 100 once the latter is formed.

The closure member 100, as described above, is a one-piece member for closing the open end 84 of the housing 80. As such, the conventional thick, metal, machined end plate 30 is replaced by a lighter, injection molded, plastic, member, which of course, lowers production costs and increases assembly speed. These advantages are achieved while still providing a filter capable of withstanding known pressures and temperature cycles.

FIG. 10 illustrates a method according to the present invention for mating a plastic housing 80 with a plastic closure member 100 to form a filter 210. The tapered edges 85 are located in the annular depression 118 of the closure member 100 between the first and second raised annular rings 116, 120. Then, the closure member 118 is spun at high speeds in, e.g., the direction shown by arrow "C" to create friction, soften edge 85 and depression 118 and meld these plastic members together. This method is known as "spin-welding" and has been used in fields other than filter production. Once cooled, this junction permanently holds the closure member 100 on the housing 80 and forms a seal therebetween. Then, the filter 210 is spun onto the filter mount 46 via the threaded aperture 102 or threaded insert 130 just like the conventional filter 10 described above.

By this method, significant labor and material costs are achieved. That is, the conventional clinching (automotive) or welding (aviation) steps for connecting the open end 28 of the housing 12 and end plate 30/retainer 32 are eliminated. Further, the two-piece, end plate 30/retainer 32 combination is replaced by a one-piece, plastic closure member 100. It is believed that overall filter production can be increased by 50% using this method.

As noted above, Assignee's above-referenced, U.S. Pat. No. 4,764,275, entitled FLUID FILTER AND METHOD FOR ATTACHING SAME IN SEALING RELATION TO A FILTER MOUNT, which is incorporated by reference herein, describes various interlocking means, such as a ring of metal flanges separately rolled and laser welded to the housing, which correspond to a set of flanges formed on a filter mount for interlocking engagement with the housing. According to the present invention, these flanges can now be integrally molded of the housing 80 or separately molded and ultrasonically welded on the housing 80.

Figure 11:
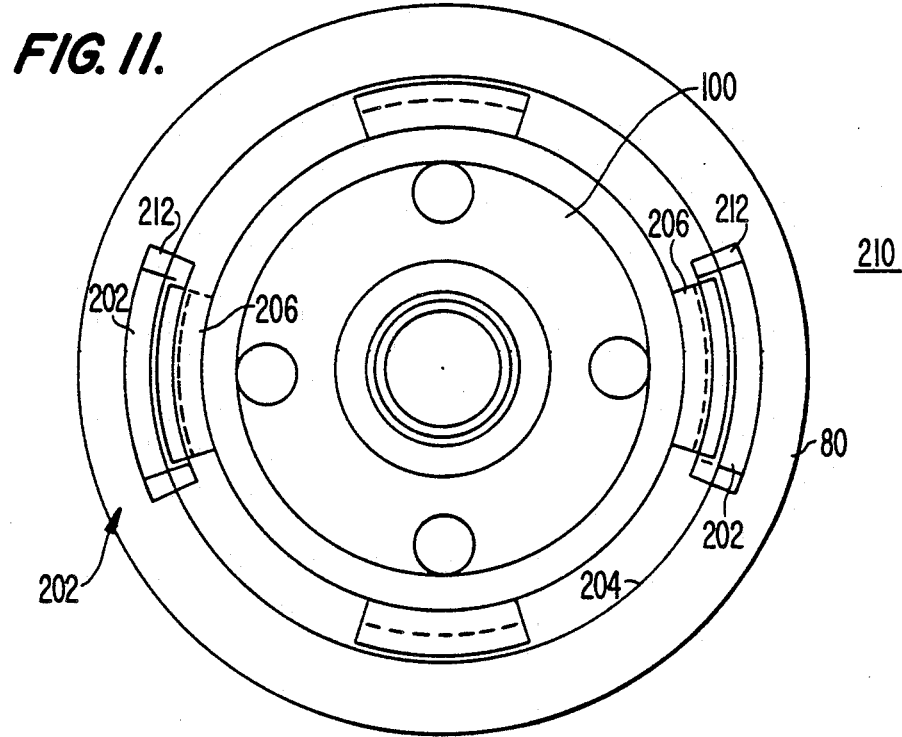
FIG. 11 is a bottom view of an alternative embodiment of the fluid filter according to the present invention.

This interlocking means technology can also be applied to connection of the closure member and the housing during manufacture of the filter. More particularly, as shown in FIGS. 11 and 12, the filter 210 includes interlocking means 200 having: a first set of circumferentially spaced projections or flanges 202 formed on the inner wall 204 of the housing 80; and a second set of circumferential, alternatingly spaced receptacles or flanges 206 formed integrally of the closure member 100, or separately molded as a ring of flanges and welded thereto. Alternatively, the closure member 100 can be a cast metal member having flanges formed thereon or a ring, including flanges, welded thereto. The number of flanges 202, 206 shown is four, respectively, but other numbers could be used.

FIGS. 12 also illustrates a method for manufacturing this filter 210. The first step involves forming the housing 80 and closure member 100 to include the locking means 200 described above. A retainer 101 is also formed in the outer circumferential wall 103 of the closure member 100 for receiving a sealing means 105, such as an O-ring or "quad seal" 107 both of which are known in the art. The sealing means 105 seals between the closure member 100 and the inner circumferential wall 204 of the housing 80 or flange 204 attached to the housing 80. With the "spin-weld" embodiment described above, the welded interface of the closure member 100 and the housing 80 creates an effective seal so no separate sealing means 105 is required.

The second step includes inserting the first set of flanges 202 between the second set of flanges 206.

The third step involves merely turning the housing 80 relative to the closure member 100 a quarter turn to lockingly engage the first and second sets of flanges 202 and 206. At least one flange of the first set of flanges 202 includes a detente 212 and at least one of the flanges of the second set of flanges 206 includes a corresponding stop, which together prevent turning of the filter 210 relative to the closure member 100 more than a quarter turn as shown in FIG. 11.

If desired, the closure member 100 can be similarly removed from the housing 80, for example, when a defect is detected in one of the parts during quality inspection after assembly.

The assembled filter 210 is spun onto a filter mount 46 via the threaded aperture 102 or threaded insert 130 just like a conventional filter is mounted.

Further, as shown in FIG. 13, the metal housing 242 shown in U.S. Pat. No. 4,764,275 having metal flanges 244 welded thereon, can be combined with a closure member 100 described above having the plastic flanges 206 molded thereof, or welded thereon. FIG. 13 shows the filter before installation of the closure member 100.

Further consistent with the flexibility associated with plastic filter fabrication according to the present invention is the use of the combined plastic pressure relief valve assembly described in Assignee's U.S. Pat. No. 4,820,409 entitled PLASTIC PRESSURE RELIEF VALVE ASSEMBLY and U.S. Pat. No. 4,935,127, entitled PRESSURE RELIEF VALVE ASSEMBLY WITH PLASTIC ONE-PIECE VALVE.

More particularly, referring to FIGS. 12 and 13, a fluid filter 210 is shown (before installation of the closure member 100) employing a plastic pressure relief valve assembly 216. The assembly 216 includes a one-piece valve body 224, with a sleeve portion 222 and a slotted portion 223, and a valve 232. The slotted portion 223 includes a plurality of radially disposed inlets 234. The valve 232 includes an axial portion 233 and a radial portion 235. The radial portion 235 normally extends angularly over the radial inlets 234 in a seated position and the axial portion 233 extends into the valve body 224 for quick connection therewith by an interference fit. The radial portion 235 of the valve 232 is flexible, and the valve 232 opens when fluid pressure reaches a predetermined level as described below. This plastic, one-piece valve 232 replaces the conventional four pieces: metal compression spring, rubber piston, metal piston support and spring retainer 59.

The ADB valve 218 includes a plastic radial flap 220 made of, e.g., a thermoplastic rubber or nylon, and can be connected to the sleeve portion 222 by an interference fit. Alternatively, as shown in FIGS. 12 and 13, the flap 220 may be integrally formed with a valve body 224 by injection molding. The ADB valve 218 overlies the fluid inlets 226 formed in the closure member 100 when the pressure relief valve assembly 216 is connected in biased relation by a spring 240 to the closure member 100 to provide an antidrain back effect. The fluid inlets 226 can be formed like the angled inlets 104 described above. Together, the flap 220 and inlets such as the angled inlets 104 effect better laminar flow of the oil, thus minimizing turbulence and increasing cooling.

Normally, incoming oil passes through the fluid inlets 226 provided in the closure member 100, past the flap 220 of the ADB valve 218, through a filter element 228 to a center tube 236 which is longitudinally aligned with the pressure relief valve assembly 216 and a central outlet 238.

In the event of filter element 228 blockage, fluid pressure increases below the valve 232 at area 230 until a threshold is reached. At that point, the valve 232 unseats and allows oil to flow through the radial slots 234 of the valve body 224, into the center tube 236 and out the central outlet 238.

The present invention contemplates, when desired, the use of the above-described closure member 100 being spin welded onto a housing 80, wherein the closure member 100 also includes a set of flanges on a surface opposite the spin welded surface for locking engagement with a filter mount 46 having corresponding flanges described in U.S. Pat. No. 4,764,275. Similarly, the above-described locking means 200 embodiment of the closure member 100 and housing 80 can be used with a housing 80 having flanges formed below the attached closure member 100 for locking engagement with a filter, mount 46 having flanges as described in the U.S. Pat. No. 4,764,275.

In either case, the closure member 100 would include a central aperture 102 for fluid flow but same would not have to be threaded. Instead, attachment of the filter 210 to the filter mount 46 would be accomplished by the interlocking means formed on the housing 80 and filter mount 46. Such design flexibility is particularly important when the differing filters and filter mounts of the original equipment manufacturers, both present and future, are considered. With the present invention, filters with screw threads or interlocking engagement, or adaptors with screw threads and/or interlocking engagement, can be more easily fabricated by plastic molding and combined where appropriate.

As can be seen from the above description, this invention solves the various disadvantages associated with other disposable fluid filters. The present invention provides quick and easy installation of the closure member on the housing. Also, because the area of attachment no longer needs to be a thick, metal end plate/retainer combination, but is instead a lighter, plastic closure member, there is a significant reduction in the cost for the non-filtration process components. Further, the present invention is easily capable of incorporating a pressure relief valve assembly and an antidrain back valve. The above-discussed problem of generating high volume filter production with quality threads, i.e. no traces of chips and burrs, is also significantly addressed. That is, the present invention does not require any high tolerance machining or cutting of the filter parts; all critical components can be formed by injection molding (except when a metal insert is used). Finally, metal to metal welding is eliminated and therefore, there are no seal leaks with the present invention.

The foregoing description of the preferred embodiments is considered as illustrative only of the principles of the invention. Further, since numerous modifications and changes will readily occur to those skilled in the art by this description, it is not desired to limit the invention to the exact construction and operation shown and described. Accordingly, all suitable modifications may be resorted to, falling within the scope of the invention as set forth in the claims and the equivalents thereto.

We claim:

1. A fluid filter for attachment to a filter mount on an engine comprising:
    (a) a filter element;
    (b) a plastic housing for the filter element having a substantially cylindrical sidewall, a closed first end and an open second end;
    (c) a plastic closure member to be directly engaged with the open second end,
    (d) plastic complimentary interengageable locking means formed radially on the open second end of the filter housing and the closure member for engaging the housing and the closure member,
    wherein the locking means includes a plurality of first members formed on the inside of the filter housing and a plurality of second members formed on the closure member,
    wherein the plurality of first members includes a first set of circumferentially spaced flanges fixedly attached to the inside of the cylindrical side wall of the filter housing.
    wherein the plurality of second members includes a second set of circumferentially spaced flanged formed on the closure member, and
    wherein each of the plurality of first members combines with a corresponding one of the plurality of second members to removably engage the housing relative to the closure member;
    (e) sealing means positioned circumferentially between the inside of the cylindrical side wall of the filter housing at the second, open end and the closure member for creating a fluid seal therebetween; and
    (f) means formed on the closure member for attaching the closure member to the filter mount.

2. The filter as recited in claim 1, wherein the closure member includes fluid inlet holes, each having an axis angled outwardly relative to the longitudinal axis of the housing.

3. The filter as recited in claim 2, wherein each fluid inlet hole includes a substantially circular portion which extends through the closure member and is bordered radially inwardly by an upstanding, semi-circular wall and radially outwardly by a sloped, semi-circular wall which leads into a fanned depressed area.

4. The filter as recited in claim 3, wherein each fluid inlet opening is separated from adjacent fluid inlet openings by radial ribs which terminate in a first annular, raised ring, and wherein the first annular raised ring is bordered radially outwardly by an annular groove, which is bordered outwardly by a second raised annular ring.

5. The filter as recited in claim 1, wherein the sealing means is selected from the group comprising an annular O-ring and quad seal positioned between the housing and the closure member.

6. The filter as recited in claim 1, wherein the closure member attachment means includes an aperture that is threaded for spin-on attachment to a threaded filter mount.

7. The filter as recited in claim 1, wherein the closure member attachment means includes an aperture which receives a threaded metal insert for spin-on attachment to a threaded filter mount.

8. The filter as recited in claim 1, further comprising means integrally formed at the interior of the first closed end of the housing for positioning and preloading the filter element.

9. The filter as recited in claim 1, further comprising one of a projection and recess means, each of a first shape formed centrally on the closed end of the housing for receiving a correspondingly shaped wrench.

10. The filter as recited in claim 1, further comprising tabs formed on the exterior of the closed end of the housing, wherein each tab has a hole formed there for receiving wire therethrough.

11. The filter as recited in claim 1, wherein the plastic is a nylon-based resin.

12. The filter as recited in claim 1, wherein the plastic is a polyamide polymer.

13. A method for forming a fluid filter to be attached to a threaded filter mount on an engine, comprising the following steps:
    (a) plastic molding a housing having a substantially cylindrical side wall, a first closed end and a second open end, the open end having plastic interengageable locking means formed radially on the inside of the cylindrical wall;

(b) plastic molding a closure member with complementary interengageable locking means formed radially therein and means for attaching the closure member to the filter mount; and (c) interengaging the locking means to directly connect the housing and the closure member.

14. The method as recited in claim 13, wherein steps (a) and (b) include the substep of:
forming a first set of circumferentially spaced flanges on the inner wall of the housing and a second set of circumferentially spaced flanges on the closure member.

15. The method as recited in claim 14, wherein step (c) comprises the substeps of:
(i) inserting the first set of flanges between the second set of flanges; and
(ii) turning the housing to engage the housing and the closure member.

16. The method as recited in claim 13, wherein step (b) comprises the substep of:
forming as the attachment means a threaded aperture in the closure member.

17. The method as recited in claim 16, further comprising the step of spinning the filter onto the filter mount via the threaded aperture.

18. The method as recited in claim 13, wherein step (b) comprises the substeps of:
(i) forming a threaded metal insert, and
(ii) forming the closure member thereon by injection molding.

19. The method as recited in claim 18, further comprising the step of spinning the filter onto the filter mount via the threaded insert.

20. The method as recited in claim 13, further comprising the step of:
(d) forming a seal between the inside of the cylindrical wall of the housing and the closure member.

21. A fluid filter for attachment to a filter mount on an engine, comprising:
(a) a filter element;
(b) a plastic housing for the filter element having a substantially cylindrical side wall, a closed first end and an open second end;
(c) a plastic closure member to be engaged with the second open end of the housing,
wherein the closure member includes fluid inlet holes, each having an axis angled outwardly relative to the longitudinal axis of the housing;

(d) plastic complementary interengageable locking means formed radially on the housing and the closure member for engaging the housing and the closure member;
(e) sealing means positioned circumferentially between the closure member and the inside of the cylindrical wall of the housing for creating a fluid seal therebetween;
(f) a plastic pressure relief valve operatively connected to the closure member; and
(g) a plastic anti-drain back valve connected to the pressure relief valve.

22. A fluid filter for attachment to a filter mount on an engine, comprising:
(a) a filter element;
(b) a housing for the filter element having a substantially cylindrical side wall, a closed first end and an open, second end;
(c) a plastic closure member welded to the second, open end of the housing, wherein the closure member includes fluid inlet holes, each having an axis angled outwardly relatively to the longitudinal axis of the housing;
(d) a plastic pressure relief valve operatively connected to the closure member; and
(e) a plastic anti-drain back valve connected to the pressure relief valve.

23. A fluid filter for attachment to a filter mount on an engine, comprising:
(a) a filter element;
(b) a plastic housing for the filter element having a substantially cylindrical side wall, a closed first end and an open second end;
(c) a plastic closure member directly welded to the second, open end of the housing; and
(d) means formed on the closure member for attaching the closure member to the filter mount, wherein the plastic is a nylon-based resin.

24. A fluid filter for attachment to a filter mount on an engine, comprising:
(a) a filter element;
(b) a plastic hosing for the filter element having a substantially cylindrical side wall, a closed first end and an open second end;
(c) a plastic closure member directly welded on the second, open end of the housing; and
(d) means formed on the closure member for attaching the closure member to the filter mount, wherein the plastic is a polyamide polymer.

* * * * *